United States Patent [19]
Goor

[11] Patent Number: 5,178,230
[45] Date of Patent: Jan. 12, 1993

[54] ENGINE MOUNTING SYSTEM
[75] Inventor: Dan Goor, Colorado Springs, Colo.
[73] Assignee: Goor Associates, Inc., Colorado Springs, Colo.
[21] Appl. No.: 727,891
[22] Filed: Jul. 10, 1991

Related U.S. Application Data

[63] Continuation-in-part of Ser. No. 630,172, Dec. 12, 1990, Pat. No. 5,076,389.

[51] Int. Cl.⁵ .................... B60K 5/00; B62D 21/15
[52] U.S. Cl. .................................. 180/232; 280/784; 248/637
[58] Field of Search ............... 180/232, 312, 294, 298, 180/299; 280/784; 248/637; 384/58; 296/35.2, 188, 189

[56]  References Cited
U.S. PATENT DOCUMENTS

| | | | |
|---|---|---|---|
| 3,638,748 | 2/1972 | Tixier | 180/64 R |
| 3,718,304 | 2/1973 | Schulz et al. | 248/9 |
| 3,815,703 | 6/1974 | De Lorean et al. | 180/91 |
| 3,851,722 | 12/1974 | Grosseau | 180/82 R |
| 3,860,258 | 1/1975 | Feustel et al. | 280/106 R |
| 3,869,017 | 3/1975 | Feustel et al. | 180/82 R |
| 3,896,739 | 7/1975 | Crofts | 105/133 |
| 4,031,978 | 6/1977 | Taylor | 180/91 |
| 4,067,524 | 1/1978 | Brinkmann | 248/9 |
| 4,073,357 | 2/1978 | Danckert | 180/64 R |
| 4,091,888 | 5/1978 | Yamanaka et al. | 180/82 R |
| 4,181,192 | 1/1980 | Danckert | 180/232 |
| 4,238,104 | 12/1980 | Hamilton | 248/566 |
| 4,822,010 | 4/1989 | Thorn | 267/140.1 |
| 4,919,474 | 4/1990 | Adachi et al. | 296/194 |

Primary Examiner—David M. Mitchell
Assistant Examiner—Paul Dickson
Attorney, Agent, or Firm—Weingarten, Schurgin, Gagnebin & Hayes

[57] ABSTRACT

An exemplary engine mounting system provides two sets of rails along which the engine can travel in the event of an impact. A first set of rails is longitudinally mounted within the vehicle with the inwardmost portions thereof curving towards the ground to prevent intrusion by the engine into the passenger compartment. A second set of rails, orthogonal to the first set, permits side-to-side movement of the engine and first set of rails. The second set of rails may be curved downward to lengthen the path of engine travel. Springs are used for biasing against both longitudinal and transverse movement, as well as for dampening of engine vibration. The two sets of rails may be used in conjunction with bumpers attached directly to the engine.

15 Claims, 4 Drawing Sheets

ENGINE MOUNTING SYSTEM

This is a continuation-in-part application under 37 C.F.R. §1.60 of U.S. patent application Ser. No. 07/630,172 filed on Dec. 12, 1990, U.S. Pat. No. 5,076,389.

FIELD OF THE INVENTION

The invention relates to the end body structure of motor vehicles, and more particularly to the mounting of engines.

BACKGROUND OF THE INVENTION

Automobile frame and body designs have taken into account the need for absorbing the impact of frontal collisions. To this end, U.S. Pat. No. 3,869,017 provides an example of an impact absorbing system for a motor vehicle containing both a plastically deformable energy absorbing frame section and break-away engine mounts which fracture in the event of a catastrophic collision and permit the engine to separate from the frame. Once the engine is separated, according to this design, the frame sections need support only the inertia load of the vehicle body. However, the design does not prevent the engine from invading the passenger compartment, where it can cause injuries to occupants.

In similar fashion, U.S. Pat. Nos. 3,718,304, 3,851,722, 4,073,357, and 4,181,192 disclose energy absorbing chassis members having severable engine mounts which allow the engine blocks to be severed from the frame in the event of a substantial impact or when a critical deceleration rate is reached. However, the releasable mounts disclosed therein do not necessarily work in cooperation with each other, so that in offset frontal impacts the engine may be only incompletely released from the frame. There is no teaching, furthermore, as to how dislocation of the engine block is controlled.

An energy absorbing motor mount assembly is disclosed in U.S. Pat. No. 4,238,104 wherein a pair of mounting elements are attached to arms that extend downward into containment housings with resilient springs for frontward and backward movement. Presumably, energy absorption is provided in fore and aft directions, but the assembly does not provide for, and in fact teaches against, the decoupling of the engine from the mounts in substantial impacts.

U.S. Pat. No. 3,638,748 discloses a chassis-frame structure having upper and lower sets of longitudinal members. A transverse cross-member which connects one of the sets of longitudinal members forces an engine block to be pivoted into the ground. The longitudinal members also flex and buckle into the ground so that the vehicle front end is raised accordingly. The movement of the engine block is substantially limited, such that the moment of inertia of the engine is not sufficiently isolated from the vehicle as a whole.

U.S. Pat. No. 4,238,104 discloses a motor mount assembly in which a mounting element, such as an arm having an enlarged head portion, is mounted for reciprocation in fore and aft directions against biasing springs inside a containment housing. The arm also permits side-to-side motion of the mounted engine. The freedom of motion permitted by this assembly, however, is limited. In a frontal collision of substantial impact the engine block must be sheared from the mounts to substantially disengage its moment of inertia from the vehicle chassis frame.

In view of the foregoing disadvantages, an engine block mount is needed for decoupling the inertial body of the engine from the vehicle frame while controlling its position relative to the frame during substantial impacts.

SUMMARY OF THE INVENTION

In surmounting the foregoing disadvantages, the present invention provides an engine block mount assembly comprising a set of longitudinally arranged rails having outwardly and inwardly biased springs for permitting movement of the engine during impact. The inward ends of the rails are curved downwards so that in an impact of substantial force the engine is directed inwards and toward the ground to prevent invasion of the passenger compartment by the engine block. The engine block is mounted on or to the rails by bearings which provide dampening of engine vibration and permit movement of the engine along the rails.

Unlike engine mountings of the prior art, the teaching of the present invention includes consideration of the relative positions of the engine block and automobile frame at different stages of impact: (1) when the engine moves forward (i.e., outward from the passenger compartment) while the nose of the vehicle begins to collapse; (2) when the engine meets the object into which the automobile has collided; and (3) when the engine rebounds rearward (towards the passenger compartment) after imparting its momentum into the colliding object. During each of these stages, the inertia load of the engine block is decoupled from the frame; yet the weight of the engine block is used advantageously to counter the momentum, if any, from the colliding object. As more of the frame collapses, the engine block is directed downward away from the passenger compartment by virtue of the downward path-of-least-resistance provided for the movement of the engine block. In another embodiment of the invention, pivots are used near the front of the engine block instead of bearings. However, the same purpose of directing the engine downwards on tracks using bearings located near the inward portion of the engine block is achieved, and this provides the engine with a path of less resistance than would otherwise be available if the engine block were to be fixed by conventional mounts to the automobile frame.

An exemplary embodiment of the invention further comprises a second set of rails disposed in a generally orthogonal direction to the longitudinal rails to permit side-to-side movement of the engine block. The second set of rails may be curved downward to increase the travel path of the engine.

In a further exemplary embodiment, the rail system of the invention is used in conjunction with a bumper system mounted by shock absorbers to the engine block.

Consequently, the present invention provides the ability to decouple the inertia of engine mass from the frame while retaining control over the movement of the engine block. The invention provides passenger safety even in offset frontal collisions which would otherwise thwart the purposes of designs which employed releasable, shearable, or slidable mounts that do not work cooperatively with other mounts to absorb the energy of collision.

DESCRIPTION OF THE DRAWINGS

A more complete understanding of the present invention and attendant advantages and features thereof will be more readily understood by reference to the following detailed description when considered in conjunction with the accompanying drawings wherein.

DETAILED DESCRIPTION OF THE INVENTION

Figure 1:
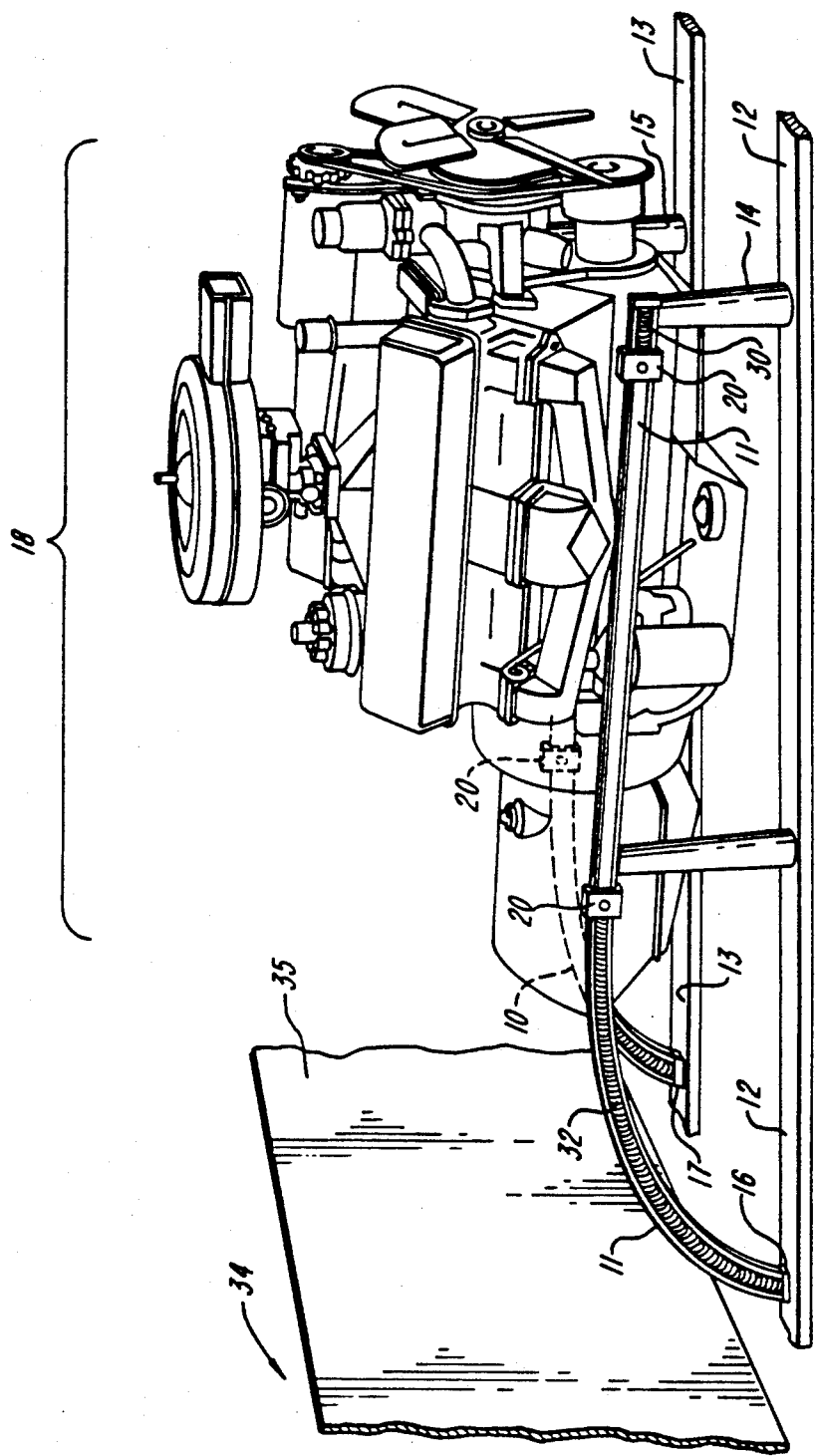
FIG. 1 is a diagrammatic side view of an engine block mount system of the present invention on an automobile frame.

FIG. 1 illustrates an exemplary embodiment of the engine block mount of the present invention. The engine block mount assembly comprises a set of rails 10 and 11 longitudinally arranged with respect to the automobile frame designated generally at 12 and 13. The front ends of the rails 10 and 11 are connected to automobile frame members 12 and 13 by means of connecting members 14 and 15, and the rear ends of the rails 10 and 11 are connected to the frame members 12 and 13 at points designated as at 16 and 17. As a variety of automobile frame shapes is possible, it is to be understood that connection of rails 10 and 11 to frame members 12 and 13, or to a unitary frame, may be accomplished by means known in the art, so long as the rearward portion of the rails are directed towards the ground to permit an engine block 18 mounted thereon to avoid the passenger compartment 34 of the vehicle.

The engine block 18 is mounted to the rails 10 and 11 by a set of bearings, designated as at 20, which permit the engine block 18 to move forward and rearward along the rails 10 and 11. A biasing means, such as springs 30, may be placed within the rails to exert a biasing force to resist the forward, or outward, movement of the engine block 18 along the rails 10 and 11. Springs 32 may similarly be placed in the rearward ends of the rails 10 and 11 to exert a forward biasing force to resist the rearward, or inward, movement of the engine block 18 along the rails. The biasing springs 30 and 32 are selected and adjusted to permit movement of the bearing-mounted engine block only when a certain force is reached, such as in substantial frontal collisions.

During the initial phase of a collision having substantial force of impact, the frontmost portions of the automobile frame 12 and 13 begin to collapse, and the engine block 18 moves forward along the rails 10 and 11 while being resisted by the rearward-biased springs 30. During impact between the engine block 18 and the object (not shown) into which the automobile collides, the momentum of the engine block 18 is transferred into the object to counter the momentum, if any, of the object; and thereafter the engine block moves rearward along the rails 10 and 11 against the forward-biased springs 32 and towards the ground along the downwardly-directed rear ends of the rails located near the frame at 16 and 17. Thus, once the engine block 18 has absorbed most of the frontal impact, the rails direct the absorbed energy of the impact towards the ground and away from the passenger compartment 34 located behind the firewall 35.

Figure 2A:
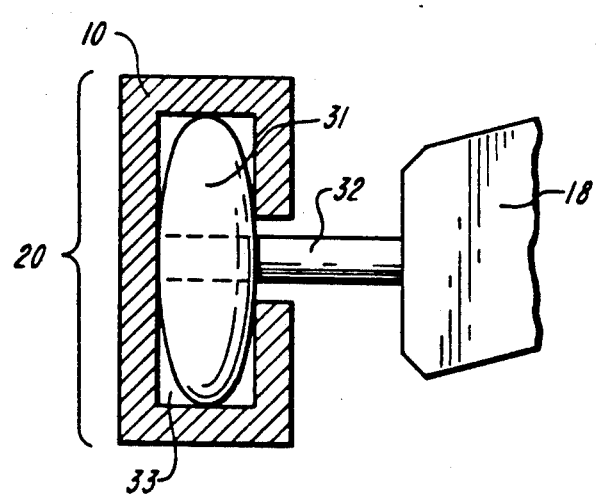
FIG. 2a is a cross-sectional view of a rail and bearing of an engine block mount system according to the invention.
Figure 2B:
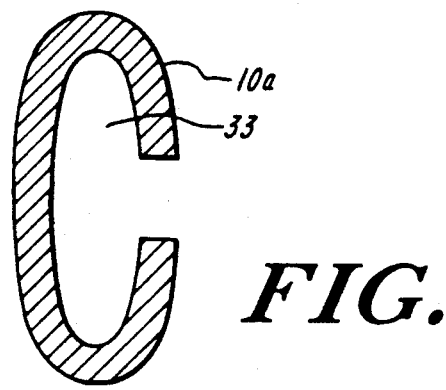
FIG. 2b is a cross-sectional view of an oval-shaped rail employed in the invention.

FIG. 2a shows an embodiment of the invention in which a bearing 31 connected by a connecting member 32 to the engine block 18 travels within a channel 33 defined by a rail shown at 10. The cross-sectional shape of the rail 10 may be any form so as to house a channel for the bearings 20, and may assume a circular or oval shape which is bent out of one piece of metal, as shown generally at 10a in FIG. 2b. The bearing 20 may be rotatably mounted on the connecting member 32, or fixed on the elongated member 32 so as to slide within the rail channel 33 as shown in FIG. 2a.

Figure 3:
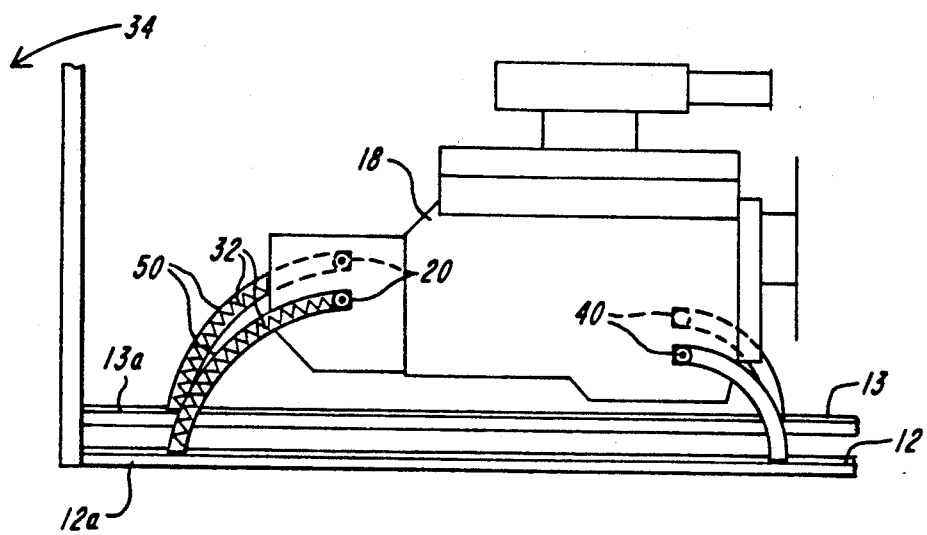
FIG. 3 is a diagrammatic side view of an engine block mount system of the present invention on an automobile frame with front pivots.

FIG. 3 shows another embodiment of the invention in which pivots 40 located on either side of the engine block 18 near the front of the engine are connected to the automobile frame portions 12 and 13 at a point relatively low to the ground. The rear of the engine block 18 has bearings 20 attached on either side of the engine block 18 and moveably attached to a pair of rails 50 which direct the engine 18 downwards upon a substantial impact which crumples the frame at portions designated generally as at 12a and 13a. The invasion of the passenger compartment 34 by the engine block 18 is thereby avoided.

Damping material such as rubber or other material may be packed between the bearings 20 and springs 30 and 32, or within the springs, so as to contribute to the ability of the engine block system to absorb engine vibration.

Figure 4:
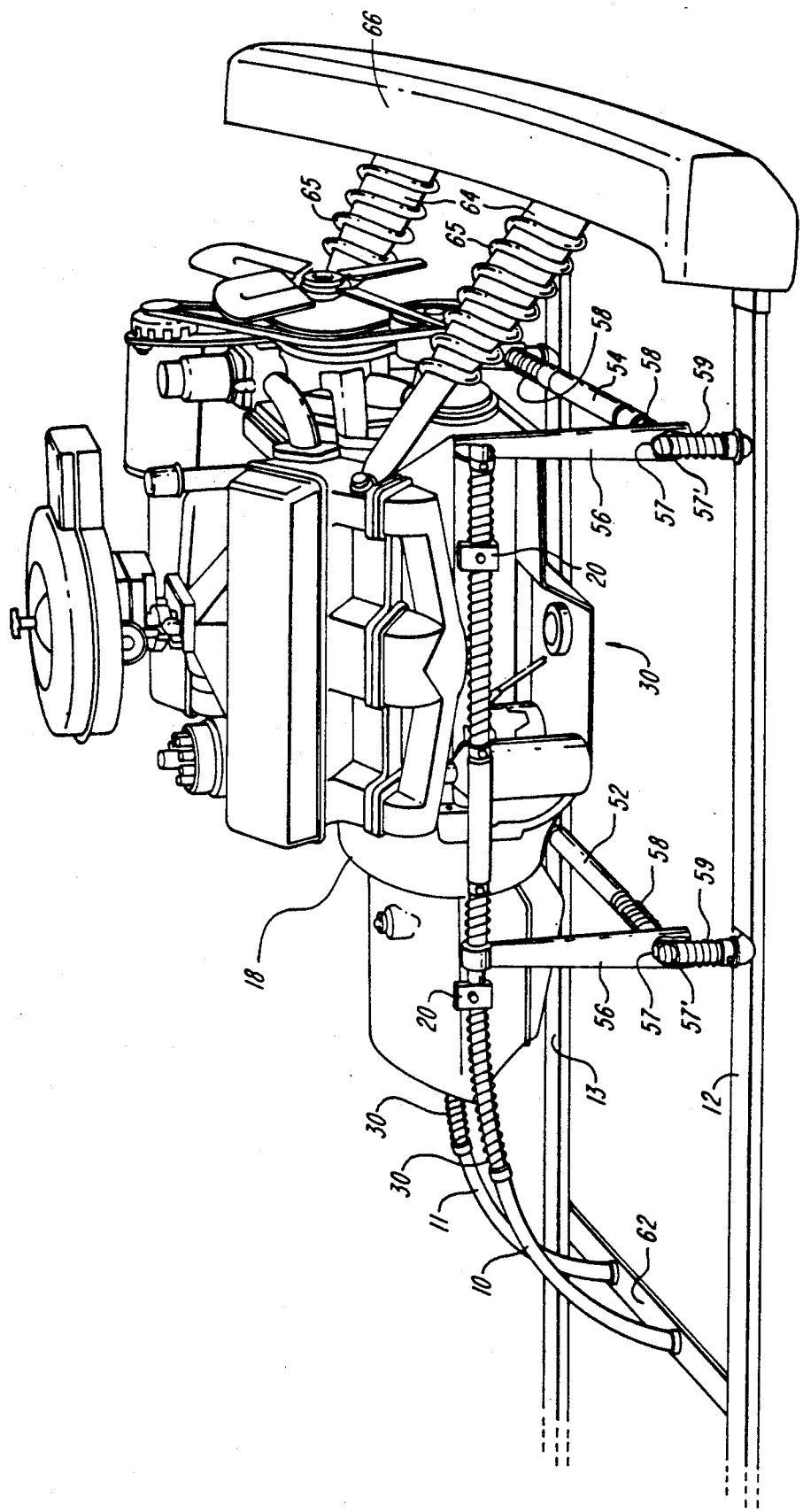
FIG. 4 is a diagrammatic view of an exemplary embodiment of an engine mounting system comprising two sets of rails.

FIG. 4 is an exemplary embodiment of an engine mount system comprising a first set of rails 10 and 11 which are longitudinally disposed with respect to the vehicle frame 12 and 13, and a second set of transverse rails 52 and 54 which are orthogonally disposed with respect to the first set 10/11. The longitudinal rails 10 and 11 are preferably not directly attached to the vehicle frame 12 and 13, or they may be detachable from the vehicle frame in the event of a collision. The longitudinal rails may also be attached to a member 62 that is detachable from the frame 12/13. Springs 30 are disposed inwardly and outwardly of the bearings 20 connected to the engine 18 to exert a biasing force to resist, respectively, the inward and outward movement of the engine along the rails 10 and 11. The inward portions of the rails 10 and 11 are curved downward to direct the travel of the engine towards the ground in the event of a substantial collision. The second set of rails 52 and 54 provides damping and a degree of freedom from the lateral inertial moment of the engine 18 during collisions and sudden lateral vehicle movement. The longitudinal rails 10 and 11 and transverse rails 52 and 54 may be connected together by vertical structural members 56. The top of the vertical members 56 are welded, bolted, or otherwise attached to the longitudinal rails 10 and 11. The vertical members are movably mounted with respect to the transverse rails 52 and 54.

In an exemplary embodiment of the invention, the vertical connecting members 56 contain holes or openings 57 operative to permit slidable mounting upon and movement along the transverse members 52 and 54. Bearings 57' located in the holes 57 provide for slideable engagement along the transverse rails 52 and 54. The transverse rails 52 and 54 each comprise springs 58 for biasing the connecting members 56 in one lateral direction and springs 59 for biasing them in the other lateral direction. The outward ends of the transverse members 52 and 54 may be curved downward or upward at the point at which the members 52 and 54 are attached to the vehicle frame 12/13, such that the force of an impact or sudden lateral movement is redirected or sustained by a longer travel path.

FIG. 4 also illustrates a further exemplary embodiment of the invention wherein the engine mounting system of the invention is used in conjunction with a bumper system. One or more shock absorbers 64 are connected to the bumper 66 and engine block 18. Such a configuration allows the impact of a collision to be absorbed directly by the engine block 18. Springs 65 on the shock absorbers 66 also help to absorb the impact. Costly damage to the vehicle frame or chassis is thereby minimized.

Figure 5:
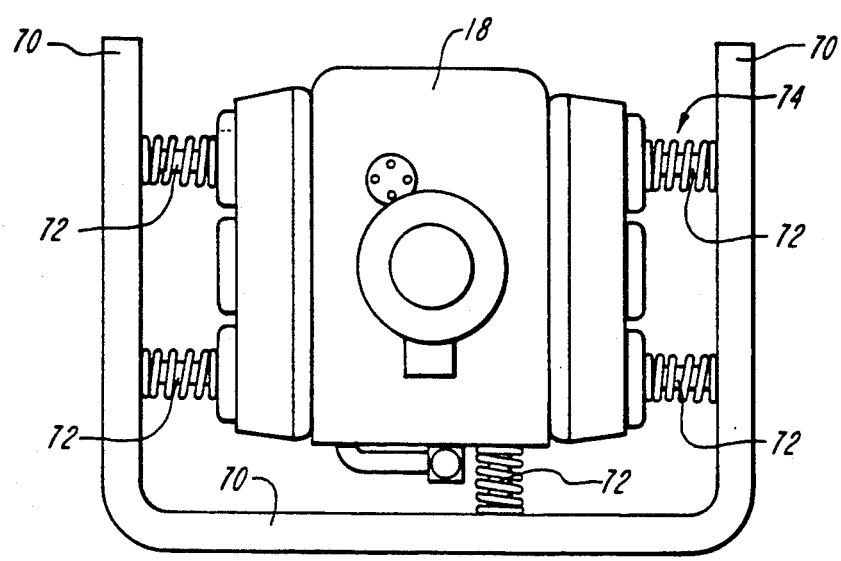
FIG. 5 is a top illustrative view of an exemplary engine extension bumper system used in conjunction with the engine mount system of the invention.

FIG. 5 is a top illustrative view of an extension bumper or bracket 70 which is attached by one or more shock absorbers 72 to the engine block 18. This extension bracket 70 system is used in conjunction with the first set 10/11 and second set 52/54 of rails described above to provide further ability to absorb the momentum of substantial collisions and impacts. The bracket 70 has a substantially curved or U-shape so that side impacts may be transmitted to the engine 18 through shock absorbers 72. The shock absorbers 72 may further be complemented by springs 74. The extension bracket 70 is preferably sized to fit within the engine compartment of the vehicle.

Although the present invention is well-suited for automobiles, it is also applicable for use in other motor vehicles such as trucks, vans, or buses. Moreover, the present invention is also applicable to rear-engine driven vehicles, since it will be understood that when such vehicles are struck from the rear, the engine block is similarly susceptible to invading the passenger compartment In such an application, the rails will be disposed so that curved ends will direct the rear-mounted engine block forward and toward the ground in a direction away from the passenger compartment.

A variety of modifications and variations are possible in light of the above teachings without departing from the scope and spirit of the invention, which is limited only by the following claims.

What is claimed is:

1. A mounting system for an engine in a motorized vehicle, comprising:
   a set of longitudinal rails having a forward first end and a rearward second end, said set of longitudinal rails having a downward curvature with respect to a road surface so that said rearward second end is lower than said forward first end;
   at least one bearing disposed on each side of said engine and movably attached to said set of longitudinal rails to permit movement of said engine along said set of longitudinal rails;
   means for longitudinally biasing said engine;
   connecting means rigidly attached to said set of longitudinal rails on a first connecting end and movably attached to a set of transverse rails on a second connecting end to permit side-to-side movement of said engine;
   said set of transverse rails orthogonally disposed with respect to said set of longitudinal rails, said set of transverse rails rigidly secured to at least one vehicle frame member; and
   means for laterally biasing said engine.

2. The mounting system of claim 1, wherein said set of longitudinal rails and said set of transverse rails are connected by vertical members operative to permit movement of one set of rails with respect to the other set.

3. The mounting system of claim 1, wherein said set of longitudinal rails is attached to a portion of a frame of said vehicle.

4. The mounting system of claim 3, wherein said set of longitudinal rails is detachable from said frame.

5. The vehicle engine mounting system of claim 1 wherein said biasing means comprise springs.

6. The mounting system of claim 1, wherein said biasing means further provides dampening of engine vibration.

7. The mounting system of claim 1, further comprising bearings operative to permit slidable movement of said connecting means along said set of transverse rails.

8. The mounting system of claim 1, wherein said set of longitudinal rails has a cross-sectional oval shape.

9. The mounting system of claim 8, wherein said set of longitudinal rails further comprises channels in which said at least one bearing travels.

10. The mounting system of claim 1, wherein said means for longitudinally biasing permits movement of said engine along said set of longitudinal rails only when a predetermined level of force is reached.

11. The mounting system of claim 1, wherein said set of transverse rails comprises at least two rails.

12. The mounting system of claim 1, wherein said set of transverse rails is solid.

13. The mounting system of claim 1, wherein said set of transverse rails includes downwardly curving end portions operative to provide a path of engine travel in a collision.

14. The mounting system of claim 1, further comprising a bumper attached to said engine by at least one shock absorber.

15. The mounting system of claim 1, further comprising a generally curved bumper attached to said engine by at least one shock absorber.

* * * * *